Figure 1:
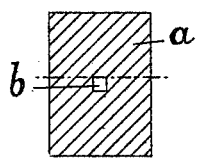

(No Model.)

J. G. WIBORGH.
METHOD OF DETERMINING HIGH TEMPERATURES.

No. 581,639. Patented Apr. 27, 1897.

Witnesses:
E. J. Griswold
S. C. Connor

Inventor:
Johan G. Wiborgh
By his attorneys
Howson and Howson

UNITED STATES PATENT OFFICE.

JOHAN GUSTAF WIBORGH, OF STOCKHOLM, SWEDEN.

METHOD OF DETERMINING HIGH TEMPERATURES.

SPECIFICATION forming part of Letters Patent No. 581,639, dated April 27, 1897.

Application filed May 3, 1895. Serial No. 548,053. (No model.)

*To all whom it may concern:*

Be it known that I, JOHAN GUSTAF WIBORGH, a subject of the King of Sweden and Norway, and a resident of Stockholm, Sweden, have invented a certain Improved Method of and Apparatus for Determining High Temperatures, of which the following is a specification.

This invention is based on the principle that if an explosive substance which explodes at a definite temperature $t'$ be inclosed in a solid body of temperature $t$ and this body be exposed to a higher temperature $T$ then the explosion of the said substance will occur after the lapse of a definite time, the length of which will depend on the explosion temperature $t'$ of the substance, on the distance of the said substance from the surface of the body, on the heat-conducting power of the body, and on the difference between the temperatures $T$ and $t$. If several such bodies be made of the same materials and in every way exactly alike, it is evident that, the initial temperature $t$ being the same, they must, when exposed to a higher but definite temperature $T$ and under equal conditions, all explode after the lapse of the same interval of time. Hence the times in which these bodies explode may be used as a measure of the temperature $T$. I propose to give to bodies of this kind for the determination of temperatures the name of "thermophone." The determination of temperatures by this method involves, of course, the loss of a thermophone at each trial. The thermophones should therefore be made of cheap materials and, moreover, be of such a quality that they will not crack when exposed to sudden and intense heat, and that they will have no injurious effect upon metals or other materials with which they may come into contact during use.

The explosion temperature of the substance and the heat-conducting power of the body in which it is contained being known, the explosion times of a thermophone of certain form can be calculated for different temperatures, but these times will preferably be determined by means of an air-pyrometer. It is then possible graphically to represent the explosion times for different temperatures by a curve. The equation of this curve can then be easily obtained, and the explosion times can thereby be calculated even for higher temperatures than it has been possible to measure by means of pyrometers as hitherto constructed. In this manner there may be constructed a scale which will give the temperature corresponding to any given time of explosion.

The shape of the thermophones is to some extent unimportant, but those that belong to the same scale of temperature must be similar. For practical reasons thermophones that are intended for very high temperatures should be made large enough to insure that exact measurements of the temperature may be made, for the larger the thermophone the longer is the time required to produce explosion at a given temperature $T$.

Figure 2:
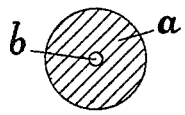

In the accompanying drawings I have shown, by way of example, a thermophone of cylindrical form, Figure 1 being a longitudinal section, and Fig. 2 a cross-section.

The refractory material is lettered $a$ and the explosive substance $b$.

The use of the thermophone is exceedingly simple. It is only necessary to throw it upon the metal bath or into the furnace the temperature of which is to be determined and to carefully note, by means of a stop-watch, the lapse of time between the instant at which the thermophone reaches its place and that at which the explosion occurs. This time being obtained the temperature can immediately be read off on the scale that corresponds to the thermophone used.

This new method of determining high temperatures possesses great advantages over other methods for the same purpose, such as those in which pyrometers, metallic alloys, "Seger pyramids," &c., are used. It is possible for a person without any particular skill to determine cheaply and quickly any temperature however high, and in a furnace or a metal bath various parts thereof are as a rule accessible for the determination of temperature by means of a thermophone. If, however, thermophones are to be used in places where there is much noise or in a slag-bath, where they may sink, the explosion may be difficult to hear. In such cases thermophones may be employed which contain, besides the explosive, some substance like baryta or strontia, which, when the explosion occurs, will color the flame, so that the explosion can be noted by sight, even if it be inaudible.

The thermophones may be manufactured of different materials, forms, and sizes, and suitably by pressing in a mold pulverized refractory materials, either in a dry or in a moist condition. The explosive, and, when required, the coloring substance, ought to be situated in the middle of the body or at its center line or at a certain distance, equal for all thermophones of the same kind, from one surface of the body.

Having now described my invention, what I claim as new, and desire to secure by Letters Patent, is—

The mode herein described of determining high temperature, consisting in inclosing an explosive substance of known quality within a solid body of known quality, putting this in the place the temperature of which is to be determined, and noting the time which elapses between the moment the substance reaches the required place and the explosion, the time so noted, indicating the temperature according to a scale corresponding to the particular substances used, substantially as set forth.

In testimony whereof I have signed my name to this specification in the presence of two subscribing witnesses.

JOHAN GUSTAF WIBORGH.

Witnesses:
  CARL P. GERELL,
  FREDRIK L. ENQUIST.